United States Patent
Ng et al.

(10) Patent No.: US 7,463,598 B1
(45) Date of Patent: Dec. 9, 2008

(54) MULTI-STREAM JITTER BUFFER FOR PACKETIZED VOICE APPLICATIONS

(75) Inventors: Lop Ng, Westlake Village, CA (US); Stanley Khouw, Simi Valley, CA (US); Molly Parks, Winnetka, CA (US)

(73) Assignee: Occam Networks, Santa Barbara, CA (US)

( * ) Notice: Subject to any disclaimer, the term of this patent is extended or adjusted under 35 U.S.C. 154(b) by 1179 days.

(21) Appl. No.: 10/052,446

(22) Filed: Jan. 17, 2002

(51) Int. Cl.
*H04L 12/16* (2006.01)

(52) U.S. Cl. ........................ 370/260; 370/271

(58) Field of Classification Search ................ 370/392, 370/260, 263, 390, 432
See application file for complete search history.

(56) References Cited

U.S. PATENT DOCUMENTS

| | | | | |
|---|---|---|---|---|
| 6,501,763 B1 * | 12/2002 | Bhagavath et al. | ........... | 370/432 |
| 6,567,929 B1 * | 5/2003 | Bhagavath et al. | ............ | 714/18 |
| 6,658,027 B1 * | 12/2003 | Kramer et al. | .............. | 370/516 |
| 6,671,262 B1 * | 12/2003 | Kung et al. | ................. | 370/260 |
| 6,735,213 B2 * | 5/2004 | Speciner | ..................... | 370/412 |
| 6,782,490 B2 * | 8/2004 | Maxemchuk et al. | ......... | 714/18 |
| 6,816,469 B1 * | 11/2004 | Kung et al. | ................. | 370/260 |
| 6,850,496 B1 * | 2/2005 | Knappe et al. | .............. | 370/260 |
| 6,940,826 B1 * | 9/2005 | Simard et al. | ............... | 370/260 |
| 6,973,184 B1 * | 12/2005 | Shaffer et al. | .......... | 379/420.01 |

| | | | |
|---|---|---|---|
| 2002/0075852 A1 | 6/2002 | Preiss | |
| 2002/0085697 A1 | 7/2002 | Simard et al. | |

OTHER PUBLICATIONS

International Search Report for PCT/US03/01091, mailed May 6, 2003, 5 pages.
"Occam Networks Introduces Broadband Loop Carrier Platforms, A New Class of Carrier Equipment That Dramatically Simplifies Delivery of Broadband and Voice Services From Remote Terminal," 2 pgs. (Apr. 2, 2001).
"Occam Networks: BLC 1100 Broadband Loop Carrier," Product Brochure, 6 pages (Oct. 2001).

* cited by examiner

*Primary Examiner*—Andrew Lee
(74) *Attorney, Agent, or Firm*—Blakely, Sokoloff, Taylor & Zafman LLP (57) ABSTRACT

In one embodiment the invention is a method. The method includes receiving data from a first party into a multiplexing device or a plurality of multiplexing devices. The method also includes receiving from a second party into a first jitter buffer, processing the data from the second party, and sending output data from the first jitter buffer to a multiplexing device or a plurality of multiplexing device. The method also includes receiving data from a third party into a second jitter buffer, processing the data from the third party, and sending output data from the second jitter buffer to a multiplexing device or a plurality of multiplexing devices. The method further includes sending data from one or a plurality of the multiplexing devices to a first output device. The method further includes sending data from one or a plurality of the multiplexing devices to a second output device. Moreover, data is further sent from one or a plurality of the multiplexing devices to a third output device. In one embodiment the data received from the first party, second party, and third party is packetized voice data.

30 Claims, 6 Drawing Sheets

MULTI-STREAM JITTER BUFFER FOR PACKETIZED VOICE APPLICATIONS

FIELD OF THE INVENTION

This invention relates to communications over a network. In particular it relates to a method of supporting multiple streams of packetized voice data in a device which supports traditional infrastructure and voice services as well as the mass deployment of broadband services.

BACKGROUND

Streaming media (e.g. audio and video) may be sent over packet networks such as the internet. Previous buffering schemes to handle the packets for packetized voice applications utilized a single jitter buffer which limits the number of voice paths which may be supported to a single path. Also, such buffering schemes require identical encoding and decoding schemes.

The jitter buffer function in a packetized voice application is to eliminate the variable inter-packet timing caused by the network a packet traverses. The jitter buffer's task is to collect enough packets to allow the slowest packets to arrive in time to be played out in the correct sequence. Some of the other more common features of a jitter buffer module are the detection of missing packets, detection of redundant packets, re-sequencing of packets (e.g. packets that arrived out of order will be rearranged and played out in the proper order).

Three-Way Calling (TWC) is a non-Centrex custom calling feature that allows one to add a third party to an existing telephone conversation without operator assistance. The procedure for setting up a three-way call is as follows:

1. Place your first call on hold by quickly pressing and releasing the receiver button (or use the Flash button)

2. You will hear a brief stutter tone. When you hear the dial tone, you can start dialing digits.

3. When the second called party answers, press and release the receiver button to connect all callers.

4. If the second called party does not answer or you reach a busy signal, push the receiver button twice to return to the first caller.

5. To end both calls, simply hang up.

6. To end the second call, push and release the receiver button, or wait for the second called party to hang up.

7. The first callers will end the original call when they hang up.

Call waiting feature informs a user already connected to a second party that another call is waiting. It does this by sending a burst of tone to the busy user. The busy station user may answer the new call by one of two methods. The busy station user may flash, placing the original call on hold and answer the new call, or the busy station user may go on-hook, in which case the station user is rung and connected to the new call upon answer. With flash a user can indefinitely switch between the second and third parties.

CW has the following main features:

1. Generation of tone for a period of time upon receiving a call from a third party.

2. If the controlling party does not flash or disconnect after the first burst of CW tone, a second burst of tone should be some time later.

3. If the controlling party answers the CW tone by going on-hook and remaining on-hook the controlling party should then be rung immediately.

4. If the controlling party answers the tone with a switch-hook flash (putting a party on hold) and subsequently goes on-hook and remains on-hook, the controller should be rung back immediately while the held party continues to be held.

5. If the held party disconnects, that party should be idled, and the talking parties should revert to a normal two-way connection. So a flash at this point will be interpreted as initiating a TWC.

A buffering scheme to handle multiple streams of packetized voice data related to the Call-Waiting (CW) and Three-Way Calling (TWC) widely available in most phone system plans is desirable.

SUMMARY OF THE INVENTION

In one embodiment the invention is a method. The method includes receiving data from a first party into a multiplexing device or a plurality of multiplexing devices. The method also includes receiving from a second party into a first jitter buffer, processing the data from the second party, and sending output data from the first jitter buffer to a multiplexing device or a plurality of multiplexing device. The method also includes receiving data from a third party into a second jitter buffer, processing the data from the third party, and sending output data from the second jitter buffer to a multiplexing device or a plurality of multiplexing devices. The method further includes sending data from one or a plurality of the multiplexing devices to a first output device. The method further includes sending data from one or a plurality of the multiplexing devices to a second output device. Moreover, data is further sent from one or a plurality of the multiplexing devices to a third output device. In one embodiment the data received from the first party, second party, and third party is packetized voice data.

In an alternate embodiment, the invention is an apparatus. The apparatus includes a jitter buffer logic block for a multi-stream voice application. The apparatus also includes a multiplexing logic block for the multi-stream voice application. The apparatus further includes an output logic block for the multi-stream voice application.

In an alternate embodiment, the invention is a system. The system includes a processor and a memory connected to the processor storing instructions for multi stream jitter buffers for packetized voice applications executed by the processor. The system further includes storage connected to the processor that stores a software code having a plurality of separately compliable routines. The processor executes the instructions on the code to receive data from a first party into a multiplexing module or a plurality of multiplexing modules. The processor also executes the instructions on the code to receive data from a second party into a first jitter buffer, processing the data from the second party, and sending output data from the first jitter buffer to a multiplexing module or a plurality of multiplexing modules. The processor further executes the instructions on the code to send data from one or a plurality of multiplexing modules to a first output module, send data from one or a plurality of multiplexing modules to a second output module, and to send data from one or a plurality of multiplexing modules to a third output module.

BRIEF DESCRIPTION OF THE DRAWINGS

The present invention is illustrated by way of example, and not limitation, in the figures of the accompanying drawings in which.

DETAILED DESCRIPTION

A method and system for providing multiple jitter buffers to handle multiple streams of data in packetized voice applications is disclosed. The jitter buffer task is to collect enough packets to allow the slowest packets to arrive in time to be played out in the correct sequence. Some of the other more common features of a jitter buffer module is the detection of missing packets, detection of redundant packets. Re-sequencing the packets, i.e. packets that arrived out of order will be rearranged and played out in the proper order, and overflow and under flow handling.

In one embodiment, a method, comprises receiving data from a first party into a multiplexing device or a plurality of multiplexing devices. The method also includes receiving data from a second party into a first jitter buffer, processing the data from the second party, and sending output data from the first jitter buffer to a multiplexing device or a plurality of multiplexing devices. The method further includes receiving data from a third party into a second jitter buffer, processing the data from the third party, and sending output data from the second jitter buffer to a multiplexing device or a plurality of multiplexing devices. The method also includes sending data from one or a plurality of multiplexing devices to a first output device. Furthermore, the method includes sending data from one or a plurality of multiplexing devices to a second output device. Moreover, the method includes sending data from one or a plurality of multiplexing devices to a third output device. This is valuable because a buffering scheme which utilizes multiple jitter buffers may handle multiple streams of packetized data in a voice application.

In the following description, for purposes of explanation, specific nomenclature is set forth to provide a thorough understanding of the present invention. However, it will be apparent to one skilled in the art that these specific details are not required in order to practice the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Terminology

For the purposes of the present specification, the term "Originating Subscriber" shall include first party, the term "Destination Subscriber" shall include second party, and the term "Add-On Subscriber" shall include third party.

In one embodiment, the invention is implemented as software within a Broadband Loop Carrier (BLC) such as the BLC 1100 by Occam Networks of Santa Barabara, Calif. In an exemplary embodiment, the BLC is a 24 port ADSL and POTS system with a 4×T1/E1 or optional fiber-optic Ethernet network uplink. The BLC is optimized for megabit data streams and supports traditional voice services (e.g. call-waiting, three-way calling, etc. . . . ). In an exemplary embodiment the BLC supports a wide variety of data, voice, and video delivery services. In alternate embodiments the invention may be implemented in an apparatus which is external to the BLC.

The Multi-Stream Jitter Buffer technique utilizes N-jitter buffers with each buffer having its own configuration to support N number of voice streams. Each voice path can support different encoding/decoding schemes. This approach may be used to support Class-5 features such as Call-Waiting (CW) and Three-Way Calling (TWC). In addition, the Multi-Stream Jitter Buffer scheme has the ability to handle different encoding and decoding voice algorithms. Since the Multi-Stream Jitter Buffer scheme is designed for multiple voice paths, it has the capability to support different codecs for every path.

The Multi-Stream Jitter Buffer technique contains an identifier for the destination and origination voice stream as well as a status indicator. The destination identifier is used for transmission routing and the origination identifier is used to mux the incoming packets. The status indicator determines which buffer is active and the type of processing required.

Figure 1:
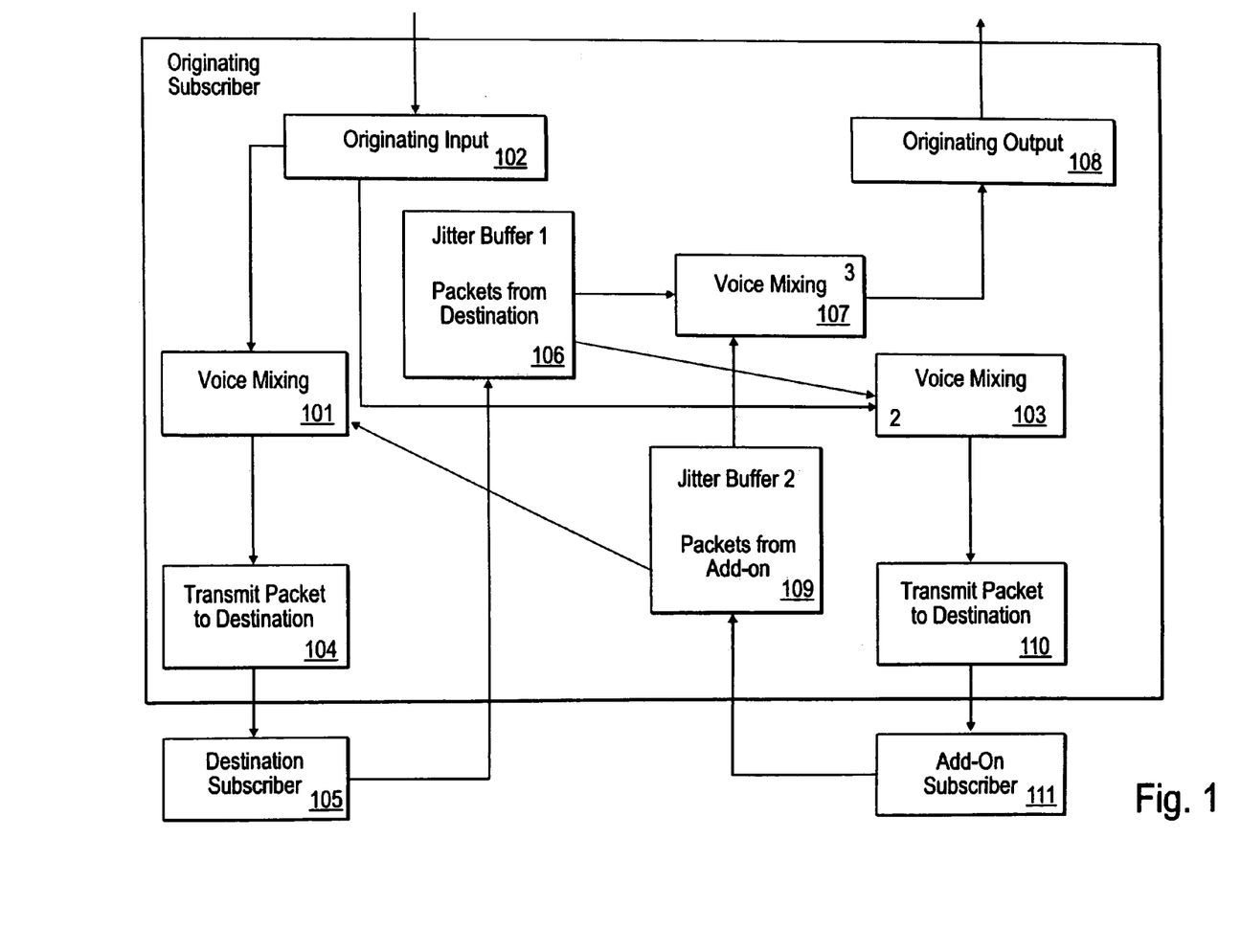
FIG. 1 illustrates a three-way calling block diagram according to one embodiment of the invention.

One example of Multi-Stream Jitter Buffer utilization is Three-Way calling. FIG. 1 illustrates a three-way calling block diagram according to one embodiment of the invention. TWC is a non-centrex custom calling feature that allows one to add a third party to an existing telephone conversation without operator assistance. TWC support requires the ability to handle two separate voice streams for transmission and reception and being able to determine when to mix and not mix the voice streams. For example, the originating subscriber (e.g. first party) to a three way call places a call to the destination subscriber (e.g. second party) and after the destination subscriber answers, the originating subscriber then initiates a second call to the add-on subscriber (e.g. third party) which completes the three-way call. The originating subscriber will need to hear the destination subscriber and the add-on subscriber. The destination subscriber needs to hear the originating subscriber and the add-on subscriber. The add-on subscriber needs to hear the originating subscriber and destination subscriber. Therefore, the packets from the destination subscriber and the packets from the add-on subscriber will need to be buffered separately.

Figure 2A:
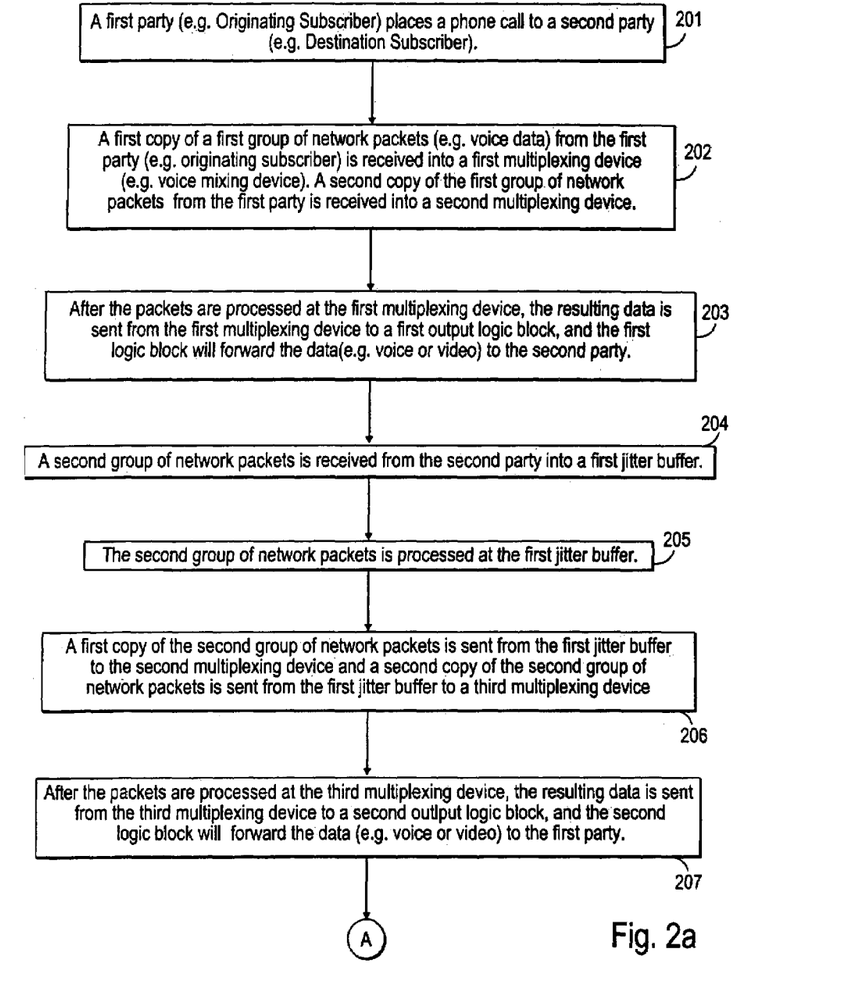
FIGS. 2A and 2B illustrate a method for handling a three-way call according to the invention.
Figure 2B:
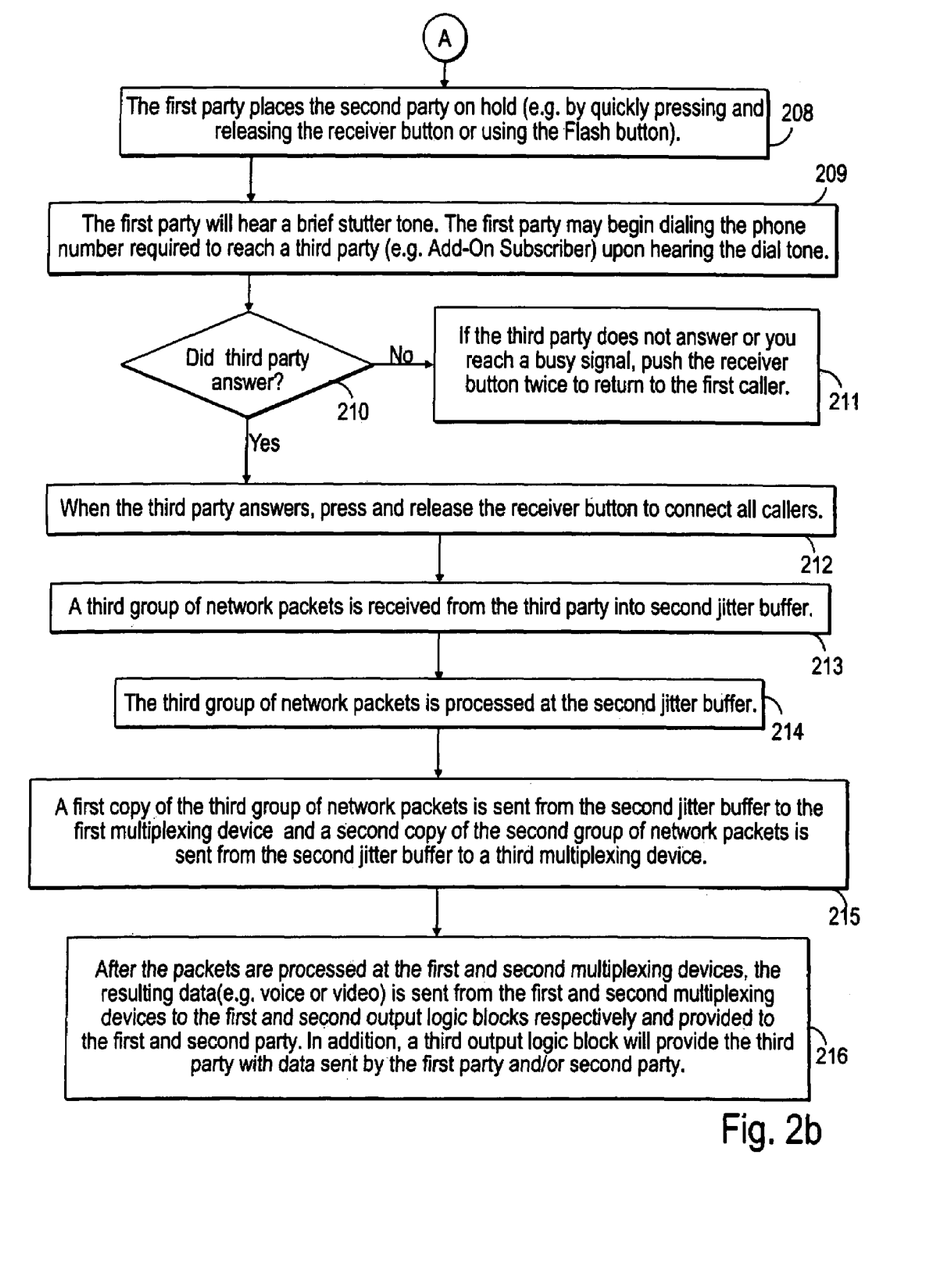

FIGS. 2A and 2B illustrates a method for handling a three-way call according to the invention. Referring to FIGS. 1, 2A, and 2B, the method 200 begins in step 201 in which a first party (e.g. Originating Subscriber) places a phone call to a second party (e.g. Destination Subscriber). In step 202, a first copy of a first group of network packets (e.g. voice or video data) from the first party is received into a first multiplexing module (e.g. voice mixing module) 101. A second copy of the first group of network packets from the first party is received into a second multiplexing module 103. Step 202 typically also includes the first group of network packets passing through an Originating input 102 module prior to entering the multiplexing module 101. In step 203, after the network packets are processed at the first multiplexing module 101, the resulting data is sent from the first multiplexing module 101 to a first output logic block 104, and the first output logic block 104 will forward the data (e.g. voice or video data) to the second party (e.g. Destination Subscriber).

In step 204, a second group of network packets is received from the second party into a first jitter buffer 106. The jitter buffer function in a packetized voice application is to eliminate the variable inter-packet timing caused by the network a packet traverses. In step 205, the second group of network packets is processed at the first jitter buffer 106. In step 206, a first copy of the second group of network packets is sent from the first jitter buffer 106 to the second multiplexing module 103 and a second copy of the second group of network packets is sent from the first jitter buffer 106 to a third multiplexing module 107.

In step 207, after the packets are processed at the third multiplexing module 107, the resulting data is sent from the third multiplexing module 107 to a second output logic block 108, and the second output logic block 108 will forward the data (e.g. voice or video) to the first party. In step 208, the first party places the second party on hold (e.g. by quickly pressing and releasing the receiver button or using the Flash button). In step 209, the first party will hear a brief stutter tone. Step 209 also typically includes the first party dialing the third party (e.g. Add-On Subscriber) upon hearing the dial tone. In step 210, a determination is made as to whether the third party answered the call from the first party. In step 211, if the third party does not answer or a busy signal is received, the first party may push the receiver twice to return to the second caller. In step 212, if the third party answers, the first party may press and release the receiver button to connect all callers.

In step 213, a third group of network packets is received form the third party into a second jitter buffer 109. In step 214, the third group of network packets is processed at the second jitter buffer 109. In step 215, a first copy of the third group of network packets is sent from the second jitter buffer 109 to the first multiplexing module 101 and a second copy of the second group of network packets is sent from the second jitter buffer 109 to a third multiplexing module 103. In step 216, after the packets are processed at the first multiplexing module 101 and second multiplexing module 103, the resulting data (e.g. voice or video) is sent from the first multiplexing module 101 and the second multiplexing module 103 to the first output logic block 104 and the second output logic block 108 respectively and further sent to the first and second party. In addition, a third output logic block 110 will provide the third party (e.g. Add-On Subscriber) 111 with data sent by the first party and/or second party.

Another example of Multi-Stream Jitter Buffer utilization is the implementation of the Call Waiting feature. CW informs a user already connected to a second party that another call is waiting. It does this by sending a burst of tone to the busy user. The busy station user may answer the new call by one of two methods. The busy station user may flash, placing the original call on hold and answer the new call, or the busy station user may go on-hook, in which case the station user is rung and connected to the new call upon answer. With flash a user can indefinitely switch between the second and third parties.

The originating subscriber places a call to the destination subscriber and after the destination subscriber answers, the add-on subscriber places a call to the originating subscriber. Based on the actions of the originating subscriber, either the destination subscriber or the add-on subscriber will be active with the other subscriber being placed on hold. The originating subscriber will need to hear both the destination subscriber and the add-on subscriber. Therefore, the packets from the destination subscriber and the add-on subscriber will need to be buffered separately, and a mechanism must be in place to allow only one of the buffers to be active.

If the controlling party does not flash or disconnect after the first burst of CW tone, a second burst of tone should be applied 10+/−1 sec later (or up to 30 sec. in an overload situation). If the controlling party answers the CW tone by going on-hook and remaining on-hook the controlling party should then be rung immediately. If the controlling party answers the tone with a switch-hook flash (putting a party on hold) and subsequently goes on-hook and remains on-hook, the controller should be rung back immediately while the held party continues to be held. If the held party disconnects, that party should be idled, and the talking parties should revert to a normal two-way connection. So a flash at this point will be interpreted as initiating a TWC.

Figure 3:
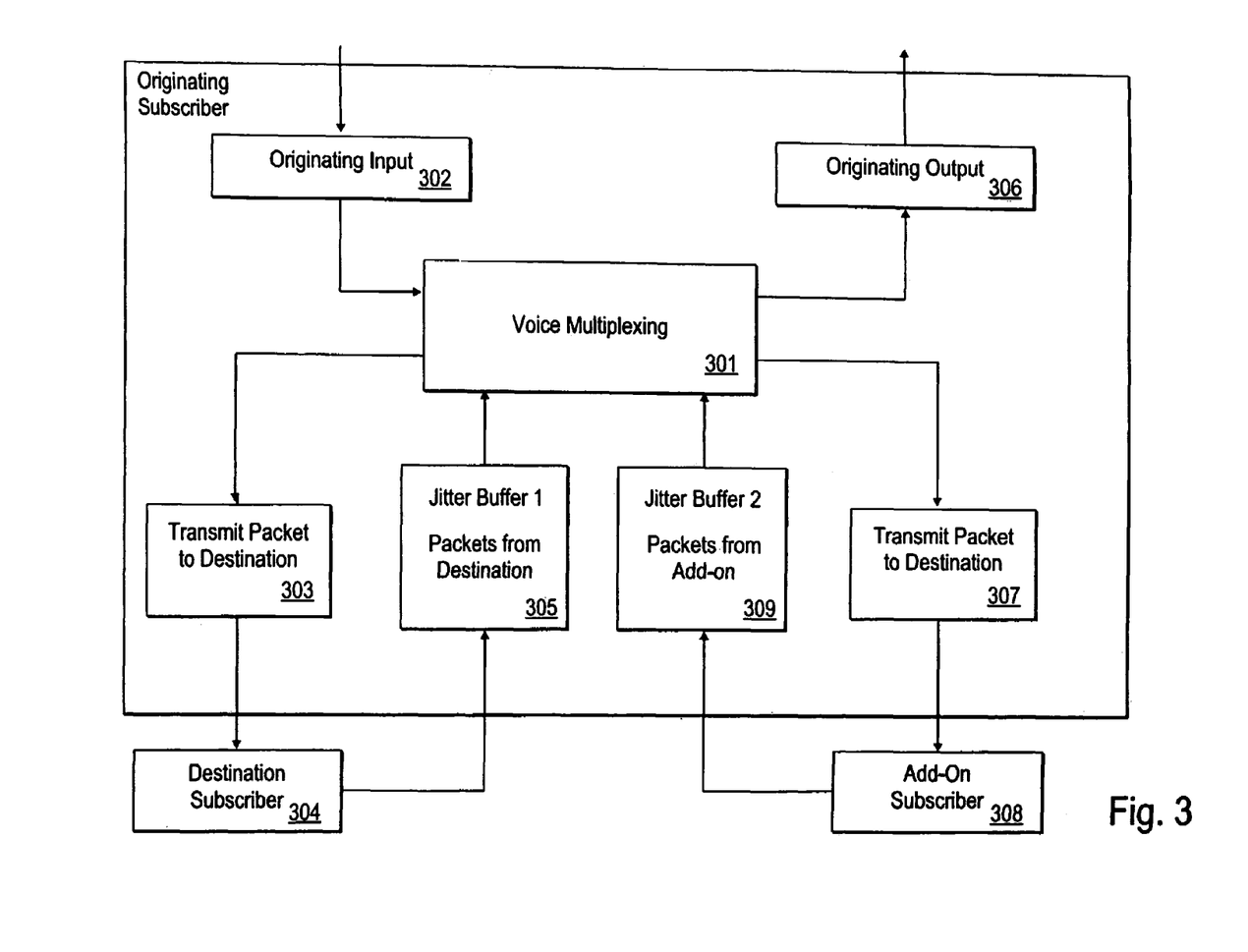
FIG. 3 illustrates a calling-waiting block diagram according to one embodiment of the invention.
Figure 4A:
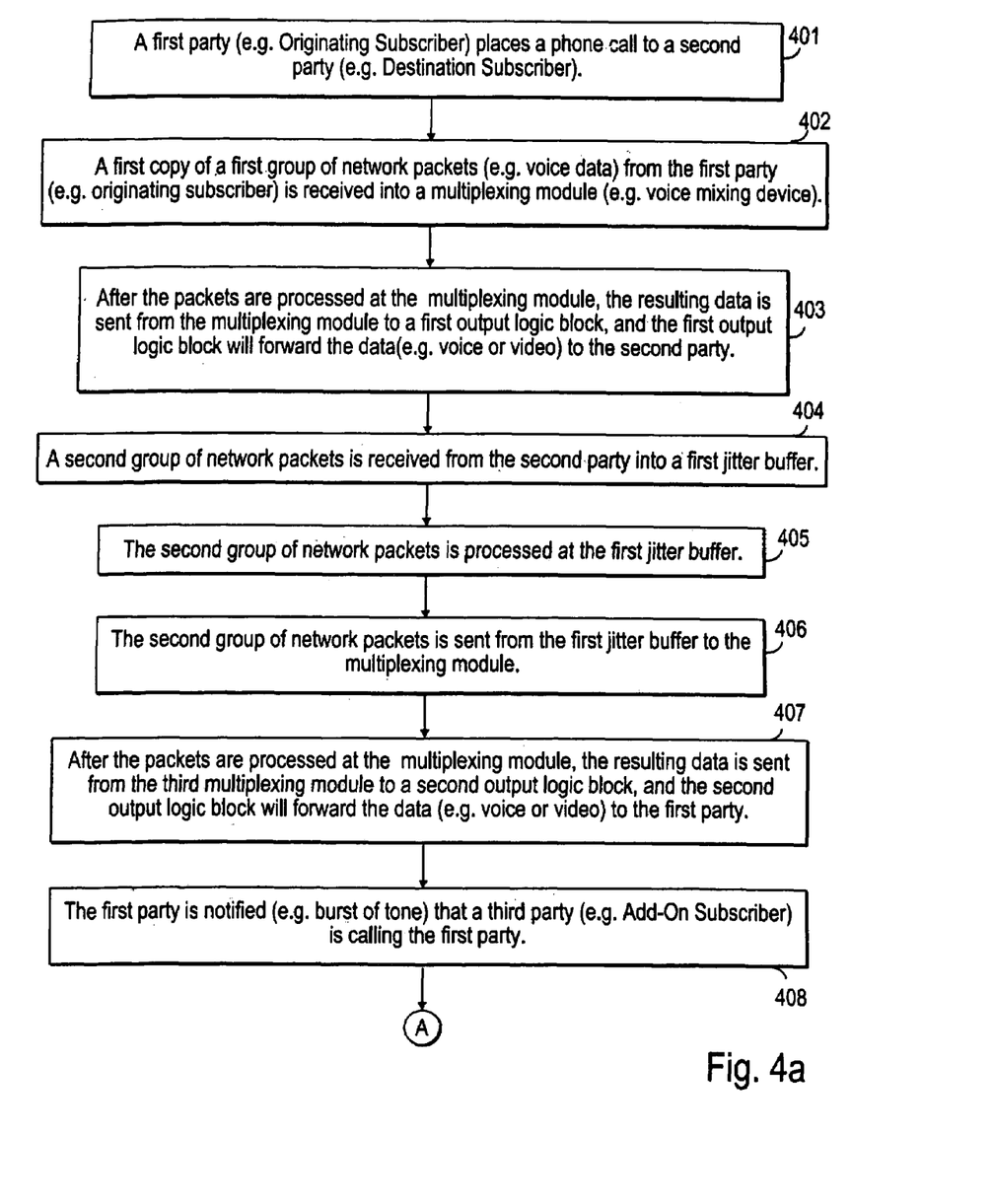
FIGS. 4A and 4B illustrate an embodiment of a method of the call-waiting feature according to the invention.
Figure 4B:
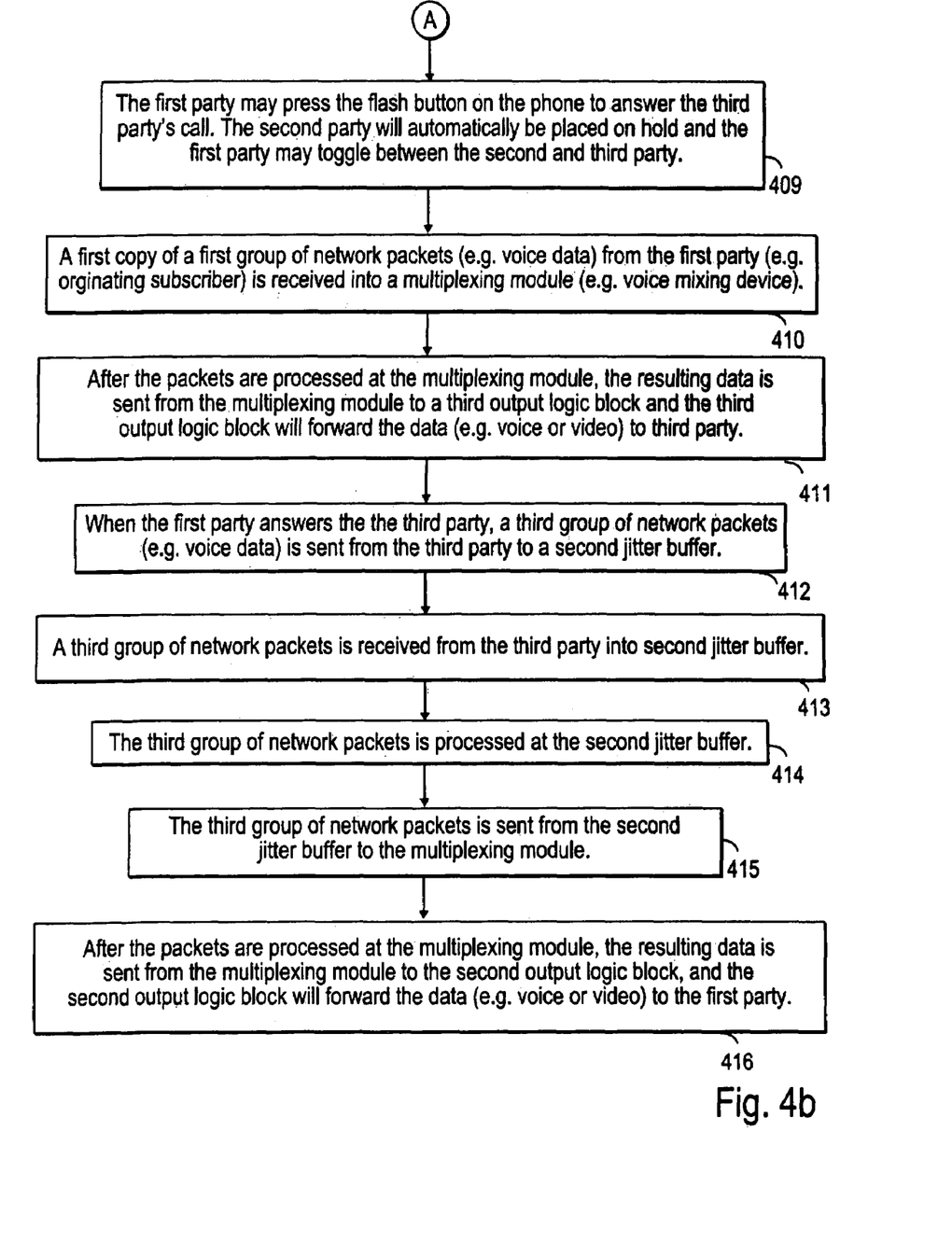

FIG. 3 illustrates a calling-waiting block diagram according to one embodiment of the invention. FIGS. 4A and 4B illustrate an embodiment of a method of the call-waiting feature according to the invention. The method 400 begins in step 401 when a first party (e.g. Originating Subscriber) places a call to a second party (e.g. Destination Subscriber). In step 402, a first copy of a first group of network packets (e.g. voice data) from the first party (e.g. Originating Subscriber) is received into a multiplexing module (e.g. voice mixing module) 301. Typically, step 402 also includes the first group of network packets being provided to the multiplexing module 301 from an input module 302. In step 403, after the packets are processed at the multiplexing module 301, the resulting data is sent from the multiplexing module 301 to a first output logic block 303, and the first output logic block 303 will forward the data (e.g. voice or video) to a second party (e.g. Destination Subscriber) 304.

In step 404, a second group of network packets is received from the second party into a first jitter buffer 305. In step 405, the second group of network packets is processed at the first jitter buffer 305. In step 406, the second group of network packets is sent from the first jitter 305 buffer to the multiplexing module 301. In step 407, after the packets are processed at the multiplexing module 301, the resulting data is sent from the multiplexing module 301 to a second output logic block 306, and the second output logic block 306 will forward the data (e.g. voice or video) to the first party. In step 408, the first party is notified (e.g. burst of tone) that a third party (e.g. Add-On Subscriber) is calling the first party. In step 409, the first party may press the flash button on the phone to answer to the third party's call. Step 409 typically also includes the second party also being placed on hold. The first party may toggle between the second and third party via the flash button.

In step 410, a first copy of a first group of network packets (e.g. voice data) form the first party (e.g. originating subscriber) is received into the multiplexing module 301. In step 411, after the packets are processed at the multiplexing module 301, the resulting data is sent form the multiplexing module 301 to a third output logic block 307, and the third output logic block 307 will forward the data (e.g. voice or video) to a third party (e.g. Add-On Subscriber) 308. In step 412, when the first party answers the third party, a third group of network packets (e.g. voice data) is sent from the third party to a second jitter buffer 309. In step 413, the third group of network packets is processed at the second jitter buffer 309. In step 414, the third group of network packets is sent from the second jitter buffer 309 to the multiplexing module 301. In step 415, after the packets are processed at the multiplexing module 301, the resulting data is sent form the multiplexing module 301 to the second output logic block 304, and the second output logic block 304 will forward the data (e.g. voice or video) to the first party through the originating output 306.

The ability to support Three-Way Calling as described above requires the DSP to be able to handle two receive streams of voice data and to mix them with the input voice data to generate two streams of output data as well as generating new inband signaling tones. With call waiting, from the DSP perspective, CW is a subset of the TWC, where two streams are still established but only one stream will be active at one time.

There are multiple jitter buffers to handle the add-on subscriber, and a module to perform the voice mixing will be included. Multiple jitter buffers are required to buffer the incoming speech packets from the add-on subscriber. The received packets will now have to be interrogated as they are received to determine which buffer they are to be stored in.

The multiplexing (e.g. voice mixing) module(s) perform the voice mixing. It mixes the voice for local output as well as for the voice for transmission to the remote subscribers. The voice-mixing module(s) determine when to mix or not mix based on the configuration contained in the connect messages. The voice mixing consists of just summing the two voice paths together.

Each jitter buffer contains a new flag to indicate the configuration of the decode path, i.e. voice or silence, based on the configuration from the connect message. Mixing is performed if both flags are configured as voice. This allows for support of Call Waiting services.

The multiplexing module(s) will contain two routines, one for the encode direction and one for the decode direction. The decode mix routine first checks to see if TWC is active. TWC is active if both the destination and add-on connection message configures the endpoints to be voice mode (Conference or Send and Receive). If TWC is not active, the routine exits. If TWC is active, the jitter buffer remove routine is called for the add-on subscriber. The buffer data is then decoded for mixing if required and saved for the encode mix routine. The mixing of the voice consists basically of adding the two voice streams together.

The encode mix routine first checks to see if TWC is active. If TWC is not active, the routine exits. If TWC is active, it checks to see if mixing is required for the destination and the add-on subscribers. After mixing is performed the voice stream to the add-on subscriber is encoded. The voice stream to the destination subscriber is not encoded.

In the foregoing detailed description, the method and apparatus of the present invention has been described with reference to specific exemplary embodiments thereof. It will, however, be evident that various modifications and changes may be made thereto without departing from the broader spirit and scope of the present invention. In particular, the separate blocks of the various block diagrams represent functional blocks of methods or apparatuses and are not necessarily indicative of physical or logical separations or of an order of operation inherent in the spirit and scope of the present invention. For example, the various blocks of FIGS. 1 and 3 may be integrated into components, or may be subdivided into components. Moreover, the blocks of FIGS. 2 and 4 represent portions of a method which, in some embodiments, may be reordered or may be organized in parallel rather than in a linear or step-wise fashion. The present specification and figures are accordingly to be regarded as illustrative rather than restrictive.

What is claimed is:

1. A method comprising:
   receiving a first data from a first party through an input module directly into a multiplexing device or a plurality of multiplexing devices;
   receiving a second data from a second party into a first jitter buffer, processing the second data from the second party, and sending a second output data from the first jitter buffer to the multiplexing device or the plurality of multiplexing devices;
   receiving a third data from a third party into a second jitter buffer, processing the third data from the third party, and sending a third output data from the second jitter buffer to the multiplexing device or the plurality of multiplexing devices, wherein the first data received from the first party is not received into the first or the second jitter buffer; and
   determining whether to combine the second output data and the third output data into a first output data for the first party subsequent to the receiving the first data based on a connect message.

2. The method of claim 1 wherein the data from the first party, the second party and the third party comprises packetized voice data.

3. The method of claim 1 wherein the multiplexing device or the plurality of multiplexing devices comprises a voice mixing device or a plurality of voice mixing devices.

4. The method of claim 1 wherein the first party, second party, and the third party are communicating through a three-way phone call.

5. The method of claim 1 wherein the first party is communicating with the second party and the third party through a call-waiting feature.

6. An apparatus comprising:
multiplexing logic and circuitry for a multi-stream voice application;
a first jitter buffer logic and circuitry coupled with the multiplexing logic and circuitry for the multi-stream voice application, the first jitter buffer logic and circuitry to receive a second data from a destination subscriber, the first jitter buffer logic and circuitry sending a second output data to the multiplexing logic and circuitry based on the second data;
a second jitter buffer logic and circuitry coupled with the multiplexing logic and circuitry for the multi-stream voice application, the second jitter buffer logic and circuitry to receive a third data from an add-on subscriber, the second jitter buffer logic and circuitry sending a third output data to the multiplexing logic and circuitry based on the third data;
an input logic and circuitry coupled with the multiplexing logic and circuitry for the multi-stream voice application, the input logic and circuitry to receive a first data from an originating subscriber; and
an output logic and circuitry for the multi-stream voice application, the output logic and circuitry to receive a first output data from the multiplexing logic and circuitry, the output logic and circuitry to send the first output data to an output logic and circuitry associated with the originating subscriber, wherein the multiplexing logic and circuitry determining whether to combine the second output data and the third output data for the first output data subsequent to the receiving the first data based on a connect message.

7. The apparatus of claim 6 wherein the multi-stream voice application accepts packetized voice data.

8. The apparatus of claim 6 wherein the multi-stream voice application accepts packetized video data.

9. The apparatus of claim 6 wherein the multiplexing logic and circuitry mixes data from multiple streams.

10. A system comprising:
a processor;
computer readable media connected to the processor storing instructions for multi stream jitter buffers for packetized voice applications executed by the processor;
storage connected to the processor that stores a software code having a plurality of separately compliable routines, wherein the processor executes the instructions on the code to
receive a first data from a first party through an input module directly into a multiplexing module or a plurality of multiplexing modules;
receive a second data from a second party into a first jitter buffer, processing the second data from the second party, and sending a second output data from the first jitter buffer to the multiplexing module or the plurality of multiplexing modules;
receive a third data from a third party into a second jitter buffer, processing the third data from the third party, and sending a third output data from the second jitter buffer to the multiplexing module or the plurality of multiplexing modules, wherein the first data received from the first party is not received into the first or the second jitter buffer; and
determine whether to combine the second output data and the third output data into a first output data subsequent to the receiving the first data based on a connect message.

11. The system of claim 10 wherein the data received from the first party, the second party and the third party comprises packetized voice data.

12. The system of claim 10 wherein the multiplexing device or the plurality of multiplexing devices comprises a voice mixing device or a plurality of voice mixing devices.

13. The system of claim 10 wherein the first party, second party, and the third party are communicating through a three-way phone call.

14. The system of claim 10 wherein the first party is communicating with the second party and the third party through a call-waiting feature.

15. A computer readable storage medium containing executable computer program instructions which when executed cause a method for accessing data in a memory to be performed, said method comprising:
receiving a first data from a first party through an input module directly into a multiplexing device or a plurality of multiplexing devices;
receiving a second data from a second party into a first jitter buffer, processing the data from the second party, and sending a second output data from the first jitter buffer to the multiplexing device or the plurality of multiplexing devices;
receiving a third data from a third party into a second jitter buffer, processing the third data from the third party, and sending a third output data from the second jitter buffer to the multiplexing device or the plurality of multiplexing devices, wherein the first data received from the first party is not received into the first or the second jitter buffer; and
determining whether to combine the second output data and the third output data into a first output data subsequent to the receiving the first data based on a connect message.

16. A computer readable medium as in claim 15 wherein the data from the first party, the second party and the third party comprises packetized voice data.

17. A computer readable medium as in claim 15 wherein the multiplexing device or the plurality of multiplexing devices comprises a voice mixing device or a plurality of voice mixing devices.

18. A computer readable medium as in claim 15 wherein the first party, second party, and the third party are communicating through a three-way phone call.

19. A computer readable medium as in claim 15 wherein the first party is communicating with the second party and the third party through a call-waiting feature.

20. A system, comprising:
means for receiving a first data from a first party through an input module directly into a multiplexing device or a plurality of multiplexing devices;
means for receiving a second data from a second party into a first jitter buffer, processing the second data from the second party, and sending a second output data from the first jitter buffer to the multiplexing device or the plurality of multiplexing devices;
means for receiving a third data from a third party into a second jitter buffer, processing the third data from the third party, and sending a third output data from the second jitter buffer to the multiplexing device or the plurality of multiplexing devices, wherein the first data received from the first party is not received into the first or the second jitter buffer; and means for determining whether to combine the second output data and the third output data into a first output data subsequent to the receiving the first data based on a connect message.

21. The system of claim 20 wherein the data from the first party, the second party and the third party comprises packetized voice data.

22. The system of claim 20 wherein the multiplexing device or the plurality of multiplexing devices comprises a voice mixing device or a plurality of voice mixing devices.

23. The system of claim 20 wherein the first party, second party, and the third party are communicating through a three-way phone call.

24. The system of claim 20 wherein the first party is communicating with the second party and the third party through a call-waiting feature.

25. The method of claim 1, further comprising:

sending the first output data from the multiplexing device or the plurality of multiplexing devices to a first output device;

sending the second output data from the multiplexing device or the plurality of multiplexing devices to a second output device; and sending the third output data from the multiplexing device or the plurality of multiplexing devices to a third output device.

26. The system of claim 10, wherein the process further causes the process to send the first output data from the multiplexing device or the plurality of multiplexing modules to a first output module;

send the second output data from the multiplexing device or the plurality of multiplexing modules to a second output module; and send the third output data from the multiplexing device or the plurality of multiplexing modules to a third output module.

27. The computer readable medium as in claim 15, wherein the method further comprises:

sending the first output data from the multiplexing device or the plurality of multiplexing devices to a first output device;

sending the second output data from the multiplexing device or the plurality of multiplexing devices to a second output device; and sending the third output data from the multiplexing device or the plurality of multiplexing devices to a third output device.

28. The system of claim 20, further comprising:

means for sending the first output data from the multiplexing device or the plurality of multiplexing devices to a first output device;

means for sending the second output data from the multiplexing device or the plurality of multiplexing devices to a second output device; and means for sending the third output data from the multiplexing device or the plurality of multiplexing devices to a third output device.

29. The apparatus of claim 6 wherein the originating subscriber, destination subscriber, and an add-on subscriber are communicating through a three-way phone call.

30. The apparatus of claim 6 wherein the originating subscriber is communicating with the destination subscriber, and the add-on subscriber through a call-waiting feature.

\* \* \* \* \*